(12) United States Patent
Harada

(10) Patent No.: US 10,252,560 B2
(45) Date of Patent: Apr. 9, 2019

(54) IMAGE FORMING APPARATUS AND IMAGE FORMING METHOD

(71) Applicant: KYOCERA Document Solutions Inc., Osaka-shi, Osaka (JP)

(72) Inventor: Hiroyuki Harada, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/903,405

(22) Filed: Feb. 23, 2018

(65) Prior Publication Data

US 2018/0244098 A1 Aug. 30, 2018

(30) Foreign Application Priority Data

Feb. 28, 2017 (JP) ................... 2017-037616

(51) Int. Cl.
*B42D 25/23* (2014.01)
*B41M 3/14* (2006.01)
*H04N 1/32* (2006.01)
*B42D 25/40* (2014.01)

(52) U.S. Cl.
CPC ............. *B42D 25/23* (2014.10); *B41M 3/14* (2013.01); *B42D 25/40* (2014.10); *H04N 1/32144* (2013.01); *H04N 2201/3271* (2013.01)

(58) Field of Classification Search
USPC ...................................... 358/1.16
See application file for complete search history.

(56) References Cited

U.S. PATENT DOCUMENTS

2016/0381250 A1* 12/2016 Hirai ................... H04N 1/4426
                                                    358/1.14
2017/0147267 A1* 5/2017 Yanagi ................. G06F 3/1208

FOREIGN PATENT DOCUMENTS

JP           11232345 A     8/1999

* cited by examiner

*Primary Examiner* — Ngon B Nguyen
(74) *Attorney, Agent, or Firm* — Alleman Hall Creasman & Tuttle LLP

(57) ABSTRACT

In an image forming apparatus, an extraction processing portion extracts one or more items of personal information from image data of a card read by an image reading portion. A document data acquiring portion acquires image data of a fixed-form document. A document layout acquiring portion acquires document layout information that indicates one or more composite positions in the image data of the fixed-form document where the one or more items of personal information are to be combined. A composition processing portion generates composite image data by combining the personal information extracted by the extraction processing portion with the image data of the fixed-form document in accordance with the document layout information. A print control portion causes an image forming portion to execute a composite image printing process of printing a composite image represented by the composite image data on a sheet.

13 Claims, 8 Drawing Sheets

FIG. 2

D1 — CARD LAYOUT INFORMATION

| CARD TYPE | PERSONAL INFORMATION ITEM | RECORDING POSITION |
|---|---|---|
| DRIVER LICENSE | NAME | AREA C1 |
| | ADDRESS | AREA C2 |
| | DATE OF BIRTH | AREA C3 |
| | FACE PHOTO | AREA C4 |
| EMPLOYEE ID CARD | COMPANY NAME | AREA C5 |
| | PARENT ORGANIZATION | AREA C6 |
| | NAME | AREA C7 |
| | EMPLOYEE NUMBER | AREA C8 |

FIG. 3

D2 — DOCUMENT LAYOUT INFORMATION

| FIXED-FORM DOCUMENT TYPE | PERSONAL INFORMATION ITEM | COMPOSITE POSITION |
|---|---|---|
| APPLICATION FORM A | NAME | AREA F1 |
| | ADDRESS | AREA F2 |
| | DATE OF BIRTH | AREA F3 |
| | COMPANY NAME | AREA F4 |
| | PARENT ORGANIZATION | AREA F5 |
| | FACE PHOTO | AREA F6 |
| | SIGNATURE | AREA F7 |
| NOTIFICATION FORM A | NAME | AREA F8 |
| | PARENT ORGANIZATION | AREA F9 |
| | EMPLOYEE NUMBER | AREA F10 |
| | ADDRESS | AREA F11 |

| APPLICATION FORM A | |
|---|---|
| NAME | XXXX XXXX |
| ADDRESS | ZZZZZZZZZZZZZZZZZZZZZZZZZZZZZ |
| DATE OF BIRTH | XX/XX/XX |
| COMPANY NAME | |
| PARENT ORGANIZATION | |
| FACE PHOTO | SIGNATURE: |

IMAGE FORMING APPARATUS AND IMAGE FORMING METHOD

INCORPORATION BY REFERENCE

This application is based upon and claims the benefit of priority from the corresponding Japanese Patent Application No. 2017-037616 filed on Feb. 28, 2017, the entire contents of which are incorporated herein by reference.

BACKGROUND

The present disclosure relates to an image forming apparatus and an image forming method.

There is known a system in which a card reader/writer reads personal data including an address and a name from a card such as an IC card or a magnetic card, the address, the name and the like are filled in an application form based on the personal data, and the application form is printed out.

SUMMARY

An image forming apparatus according to an aspect of the present disclosure includes an image reading portion, an image forming portion, a card data acquiring portion, an extraction processing portion, a document data acquiring portion, a document layout acquiring portion, a composition processing portion, and a print control portion. The image reading portion reads image data of a document sheet. The image forming portion forms an image on a sheet. The card data acquiring portion acquires image data of a card from the image reading portion. The extraction processing portion extracts one or more items of personal information from the image data of the card. The document data acquiring portion acquires image data of a fixed-form document. The document layout acquiring portion acquires document layout information that indicates one or more composite positions in the image data of the fixed-form document where the one or more items of personal information are to be combined. The composition processing portion generates composite image data by combining the personal information extracted by the extraction processing portion with the image data of the fixed-form document in accordance with the document layout information. The print control portion causes the image forming portion to execute a composite image printing process of printing a composite image on the sheet, the composite image being represented by the composite image data generated by the composition processing portion.

An image forming method according to another aspect of the present disclosure includes: acquiring image data of a card from an image reading portion that is configured to read image data of a document sheet; extracting one or more items of personal information from the image data of the card; acquiring image data of a fixed-form document; acquiring document layout information that indicates one or more composite positions in the image data of the fixed-form document where the one or more items of personal information are to be combined; generating composite image data by combining the personal information extracted from the image data of the card with the image data of the fixed-form document in accordance with the document layout information; and causing an image forming portion that is configured to form an image on a sheet, to execute a composite image printing process of printing a composite image on the sheet, the composite image being represented by the composite image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram showing an example of card layout information used in the image forming apparatus according to the embodiment of the present disclosure.

FIG. 3 is a diagram showing an example of document layout information used in the image forming apparatus according to the embodiment of the present disclosure.

FIG. 8 is a diagram showing an example of composite image data used in the image forming apparatus according to the embodiment of the present disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Configuration of Image Forming Apparatus]

Figure 1:
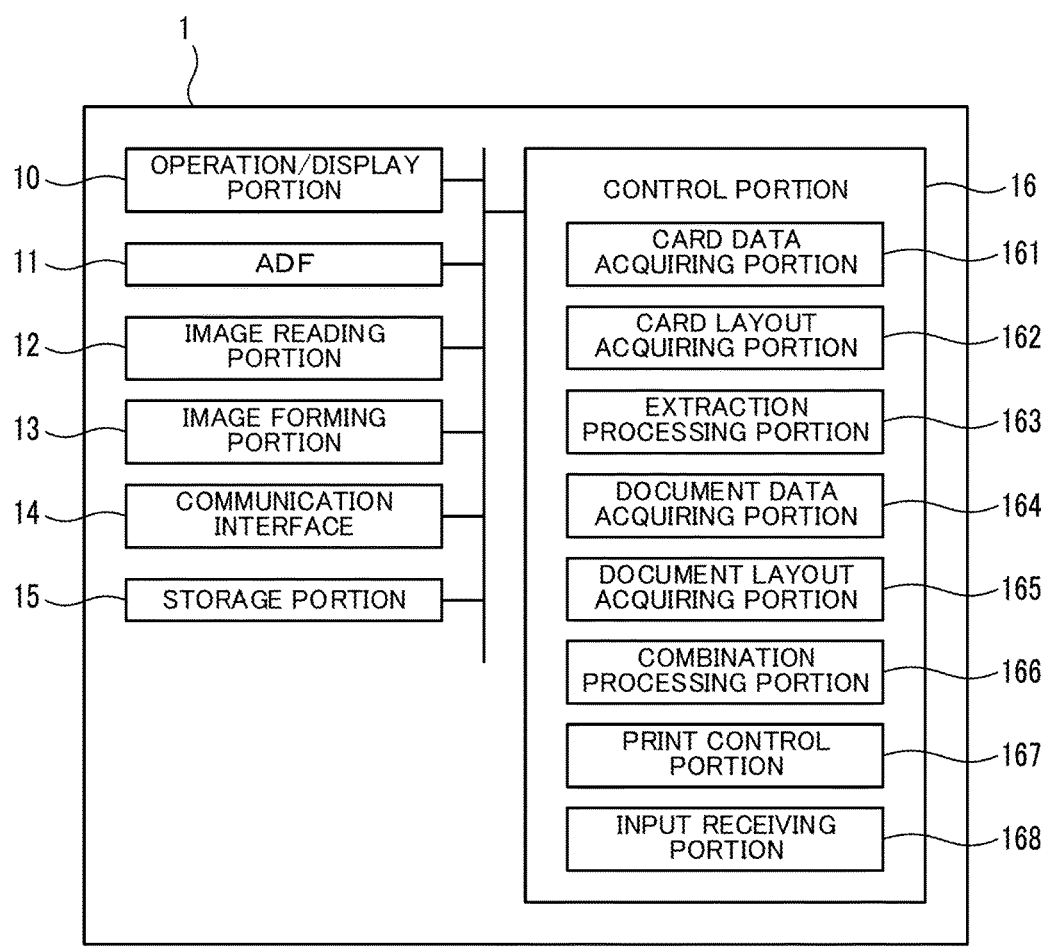
FIG. 1 is a block diagram showing a system configuration of an image forming apparatus according to an embodiment of the present disclosure.

As shown in FIG. 1, an image forming apparatus 1 according to the embodiment of the present disclosure includes an operation/display portion 10, an ADF (Auto Document Feeder) 11, an image reading portion 12, an image forming portion 13, a communication interface 14, a storage portion 15, and a control portion 16. Specifically, the image forming apparatus 1 is a multifunction peripheral having a plurality of functions such as a printer function, a scanner function, a copy function, and a facsimile function. It is noted that the present disclosure is not limited to a multifunction peripheral, but is applicable to a copier.

The operation/display portion 10 includes a display portion and an operation portion, wherein the display portion is, for example, a liquid crystal display and displays information, and the operation portion includes a touch panel and operation buttons for receiving information input operations from the user.

The ADF 11 is an automatic document feeding device including a document sheet setting portion, conveyance rollers, a document sheet pressing, and a sheet discharge portion, and conveys a document sheet so that it is read by the image reading portion 12.

The image reading portion 12 includes a document sheet table, a light source, a mirror, an optical lens, and a CCD (Charge Coupled Device), and is configured to read image data of a document sheet.

The image forming portion 13 is configured to execute a printing process based on image data by the electrophotographic method or the inkjet method to form an image on a sheet based on the image data. For example, when the image forming portion 13 is an electrophotographic image forming portion, the image forming portion 13 includes a photoconductor drum, a charger, an exposure device, a developing device, a transfer device, and a fixing device.

The communication interface 14 is configured to perform communications with external information processing apparatuses such as a facsimile apparatus or a personal computer, via a communication network such as a telephone line, the Internet, or a LAN, in accordance with a predetermined communication protocol.

The storage portion 15 is a nonvolatile storage portion such as a hard disk or an EEPROM™. The storage portion 15 stores various types of data and various types of control programs that are executed by the control portion 16.

The control portion 16 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 16 includes a card data acquiring portion 161, a card layout acquiring portion 162, an extraction processing portion 163, a document data acquiring portion 164, a document layout acquiring portion 165, a composition processing portion 166, a print control portion 167, and an input receiving portion 168. It is noted that the control portion 16 functions as these processing portions when it executes various processes in accordance with the control programs. In addition, the control portion 16 may include an electronic circuit that realizes a part or a plurality of processing functions of the processing portions.

Meanwhile, there is known, as a system related to the image forming apparatus 1 of the present embodiment, a system in which a card reader/writer reads personal data including an address and a name from a card such as an IC card or a magnetic card, the address, the name and the like are filled in an application form based on the personal data, and the application form is printed out. However, in order to use this system, an electronic storage medium such as an IC card or a magnetic card needs to be prepared in advance. On the other hand, in the image forming apparatus 1 according to the present embodiment, it is possible to easily generate a fixed-form document with personal information filled therein, without using an electronic storage medium storing the personal information.

The card data acquiring portion 161 is configured to acquire image data P1 of a card from the image reading portion 12. The card may be, for example, a driver license, an employee ID card, a membership card, an insurance card, or a passport.

The card layout acquiring portion 162 is configured to acquire card layout information D1 (see FIG. 2), wherein each piece of card layout information D1 indicates one or more items of personal information and recording positions thereof, wherein the personal information is recorded on a surface (a front or rear surface) of the card. The personal information may be recorded on the card by being printed on, hand-written on, or adhered to the card. The personal information may be, for example, a name, an address, a telephone number, an e-mail address, a parent organization name, an employee number, a date of birth, and a face photo.

Figure 4:
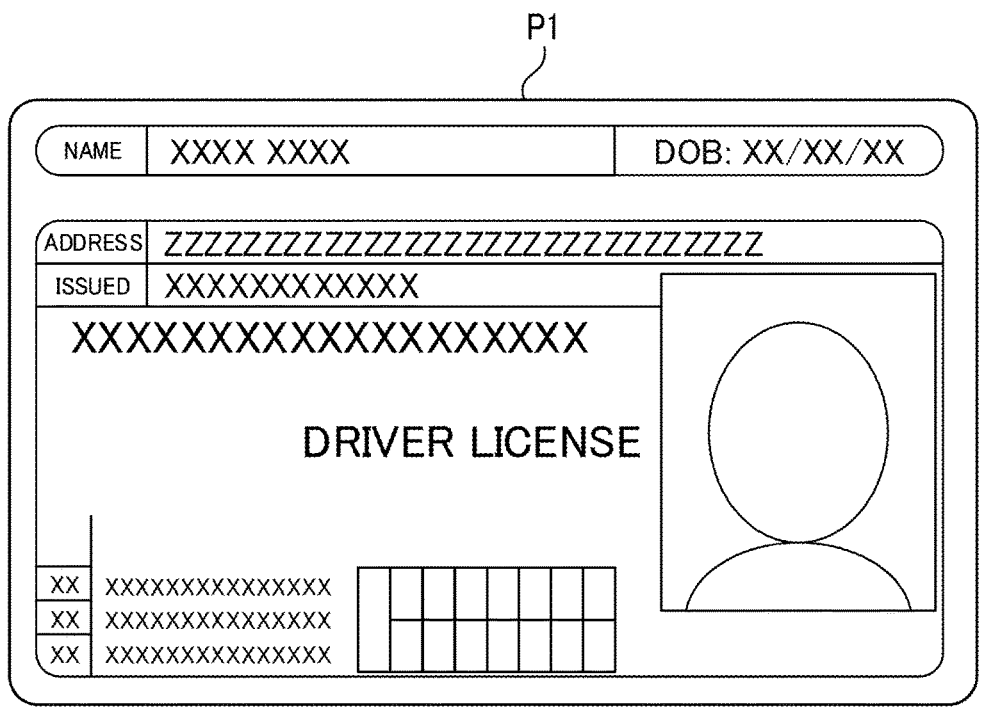
FIG. 4 is a diagram showing an example of image data of a card used in the image forming apparatus according to the embodiment of the present disclosure.
Figure 5:
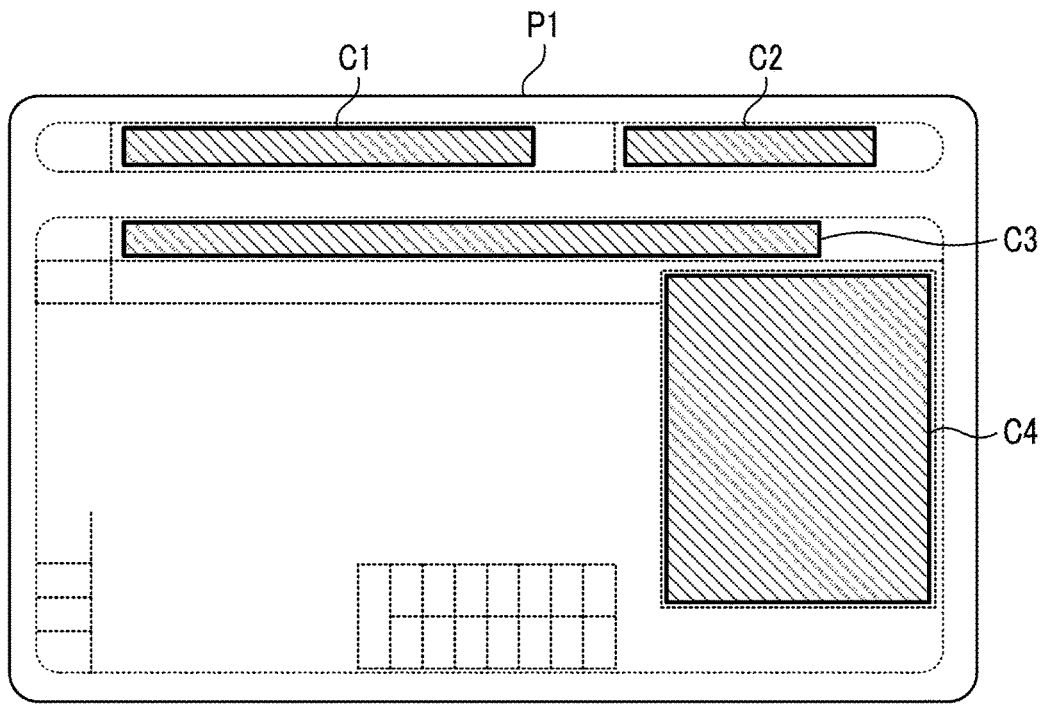
FIG. 5 is a diagram showing an example of recording positions of personal information in the image data of the card.

As shown in FIG. 2, the card layout information D1 indicates, for each type of card, one or more items of personal information recorded on the card and recording positions of the one or more items of personal information. For example, as shown in FIG. 4, in a case where the card is a driver license, the image data P1 of the card includes four items of personal information (a name, an address, a date of birth, and a face photo). In addition, the card layout information D1 indicates the recording positions (areas C1 to C4 shown in FIG. 5) of the four items of personal information. Each recording position is represented by, for example, coordinate values of two apices on a diagonal line of a rectangular area in which the corresponding item of personal information is recorded.

The card layout acquiring portion 162 acquires the card layout information D1 from, for example, the storage portion 15. It is noted that the card layout acquiring portion 162 may acquire the card layout information D1 via the operation portion (the operation/display portion 10). That is, the card layout information D1 may be generated in accordance with a user operation. In addition, the card layout acquiring portion 162 may acquire the card layout information D1 from an external information processing apparatus (for example, an information processing apparatus connected to the image forming apparatus 1 via a LAN, or a server apparatus on the Internet) via the communication interface 14. Furthermore, the card layout acquiring portion 162 may acquire the card layout information D1 based on the image data P1 of a plurality of cards of a same type read by the image reading portion 12. For example, the card layout acquiring portion 162 may automatically determine an area in which a different character sequence is recorded on a plurality of cards of a same type, as a recording position of an item of personal information. In addition, the card layout acquiring portion 162 may automatically determine an item of personal information corresponding to a character sequence, based on the characteristics of the character sequence (for example, characters, words, and signs included in the character sequence, and the length of the character sequence).

The extraction processing portion 163 is configured to extract one or more items of personal information from the image data P1 of a card. For example, the extraction processing portion 163 may extract the personal information from the image data P1 of the card based on the card layout information D1. In addition, the extraction processing portion 163 may extract a plurality of items of personal information from the image data P1 of a card. For example, in a case where the card is a driver license, the extraction processing portion 163 extracts the four items of personal information (a name, an address, a date of birth, and a face photo) from the areas C1 to C4 in the image data P1 of the card.

It is noted that the extraction processing portion 163 may extract, as an item of personal information, an image (a piece of image data) or a character sequence (a piece of text data) from a corresponding recording area in the image data P1 of the card. For example, the extraction processing portion 163 may execute a character recognition process on the image data P1 of the card, and extract, as an item of personal information, a piece of text data from a corresponding recording area in the image data P1 of the card.

The document data acquiring portion 164 is configured to acquire image data P2 (see FIG. 6) of a fixed-form document. The types of fixed-form document include an application form and a notification form. Each type of fixed-form document includes one or more entry fields in which one or more items of personal information are to be filled. The document data acquiring portion 164 acquires image data P2 of a fixed-form document from, for example, the storage portion 15. It is noted that the document data acquiring portion 164 may acquire image data P2 of a fixed-form document from the image reading portion 12. In addition, the document data acquiring portion 164 may acquire image data P2 of a fixed-form document from an external information processing apparatus (for example, an information processing apparatus connected to the image forming apparatus 1 via a LAN, or a server apparatus on the Internet) via the communication interface 14.

The document layout acquiring portion 165 is configured to acquire document layout information D2 (see FIG. 3) that indicates composite positions of items of personal information in the image data P2 of the fixed-form document.

Figures 6, 7:
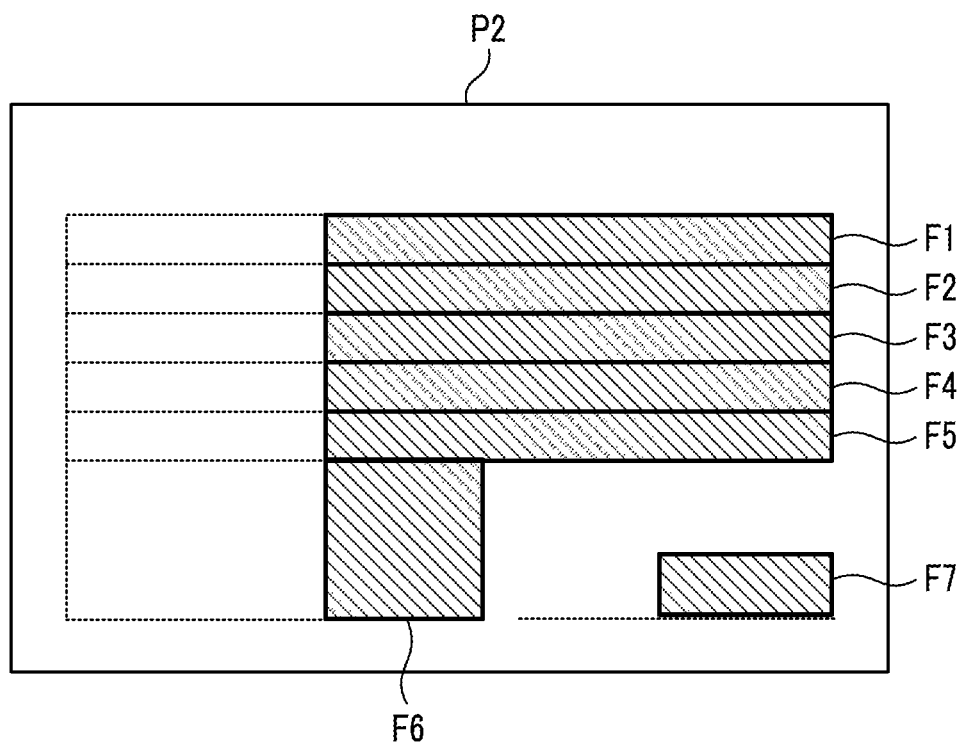
FIG. 6 is a diagram showing an example of image data of a fixed-form document used in the image forming apparatus according to the embodiment of the present disclosure.
FIG. 7 is a diagram showing an example of composite positions of the personal information in the image data of the fixed-form document.

As shown in FIG. 3, the document layout information D2 indicates, for each type of fixed-form document, one or more items of personal information that are to be filled in the fixed-form document, and composite positions of the one or more items of personal information. For example, as shown in FIG. 6, in a case where the fixed-form document is an application form A, the image data P2 of the fixed-form document includes seven entry fields in which seven items of personal information (a name, an address, a date of birth, a company name, an affiliation section, a face photo, and a signature) should be filled in, respectively. In addition, the document layout information D2 indicates the composite positions (the areas F1 to F7 shown in FIG. 7) of the seven items of personal information. Each composite position is represented by, for example, coordinate values of two apices on a diagonal line of a rectangular area in which the corresponding item of personal information is to be filled.

The document layout acquiring portion 165 acquires the document layout information D2 from, for example, the storage portion 15. It is noted that the document layout acquiring portion 165 may acquire the document layout information D2 via the operation portion (the operation/display portion 10). That is, the document layout information D2 may be generated in accordance with a user operation. In addition, the document layout acquiring portion 165 may acquire the document layout information D2 from an external information processing apparatus (for example, an information processing apparatus connected to the image forming apparatus 1 via a LAN, or a server apparatus on the Internet) via the communication interface 14.

The composition processing portion 166 is configured to combine the personal information extracted by the extraction processing portion 163 with the image data P2 of the fixed-form document in accordance with the document layout information D2. With this operation, for example, the personal information extracted from the image data P1 of the card is combined with the image data P2 of the fixed-form document, and image data P3 shown in FIG. 8 is generated, wherein the image data P3 is composite image data. It is noted that in a case where the personal information extracted by the extraction processing portion 163 is text data, the composition processing portion 166 combines the text data with the image data P2 of the fixed-form document.

The print control portion 167 is configured to cause the image forming portion 13 to execute a composite image printing process based on the composite image data P3. In the composite image printing process, a composite image represented by the composite image data P3 is formed on a sheet. This allows the fixed-form document with the personal information filled therein to be output from the image forming apparatus 1.

The input receiving portion 168 is configured to, in a case where at least one of the plurality of items of personal information that are to be combined with the image data P2 of the fixed-form document has failed to be extracted by the extraction processing portion 163, acquire the at least one item of personal information via the operation portion (the operation/display portion 10). For example, suppose that, among the plurality of items of personal information that are to be combined with the image data P2 of the application form A shown in FIG. 6, a company name, an affiliation section, a face photo, and a signature have failed to be extracted from the image data P1 of the driver license shown in FIG. 4. In this case, the input receiving portion 168 may acquire the company name, affiliation section, face photo, and signature via the operation portion (the operation/display portion 10). This allows the composition processing portion 166 to combine some items of personal information acquired by the input receiving portion 168, and other items of personal information extracted by the extraction processing portion 163 with the image data P2 of the fixed-form document.

It is noted that the card data acquiring portion 161 may acquire a plurality of pieces of image data P1, namely, a plurality of pieces of image data of a plurality of cards, from one piece of image data read by the image reading portion 12.

For example, in a state where a driver license and an employee ID card are both placed on the document sheet table, the image reading portion 12 can read images of the two cards as one piece of image data. In this case, the card data acquiring portion 161 may extract the image data P1 of the driver license and the image data P1 of the employee ID card from the one piece of image data read by the image reading portion 12. At this time, the composition processing portion 166 may combine a plurality of items of personal information extracted from the image data P1 of the plurality of cards acquired by the card data acquiring portion 161 with the image data P2 of one fixed-form document. For example, the name, address, date of birth, and face photo extracted from the image data P1 of the driver license, and the company name and affiliation section extracted from the image data P1 of the employee ID card, may be combined into the corresponding areas in the application form A. This makes it possible to automatically combine the personal information into an increased number of entry fields included in the fixed-form document.

In addition, for example, in a state where a driver license of user A and a driver license of user B are both placed on the document sheet table, the image reading portion 12 can read images of the two driver licenses as one piece of image data. In this case, the card data acquiring portion 161 may extract the image data P1 of the driver license of user A and the image data P1 of the driver license of user B from the one piece of image data read by the image reading portion 12. This allows the composition processing portion 166 to execute the process of combining personal information with image data P2 of a fixed-form document, individually for each of a plurality of pieces of image data P1 of a plurality of cards acquired by the card data acquiring portion 161. For example, the composition processing portion 166 may individually execute a process of combining personal information extracted from the image data P1 of the driver license of the user A with image data P2 of an application form A, and a process of combining personal information extracted from the image data P1 of the driver license of the user B with the image data P2 of the application form A. This results in a piece of composite image data P3 corresponding to the driver license of the user A, and another piece of composite image data P3 corresponding to the driver license of the user B. Subsequently, the print control portion 167 may cause the image forming portion 13 to execute the composite image printing process for each of the plurality of pieces of image data P1 of the plurality of cards acquired by the card data acquiring portion 161. This allows the application form A with the personal information of the user A filled therein, and the application form A with the personal information of the user B filled therein to be output from the image forming apparatus 1. With this configuration, a plurality of fixed-form documents with personal information of different users filled therein can be generated easily and in a short time.

It is noted that the card data acquiring portion 161 and the document data acquiring portion 164 may acquire image data P1 of a card and image data P2 of a fixed-form document, from one piece of image data read by the image reading portion 12. For example, in a case where a driver license and an unfilled application form B are both placed on the document sheet table, the image reading portion 12 can read images of these documents as one piece of image data. In this case, the card data acquiring portion 161 and the document data acquiring portion 164 may respectively acquire the image data P1 of the driver license and the image data P2 of the application form B from the one piece of image data read by the image reading portion 12. At this time, the composition processing portion 166 may combine the personal information extracted from the image data P1 of the card acquired by the card data acquiring portion 161 with the image data P2 of the fixed-form document acquired by the document data acquiring portion 164.

[Filled Document Printing Process]

Figure 9:
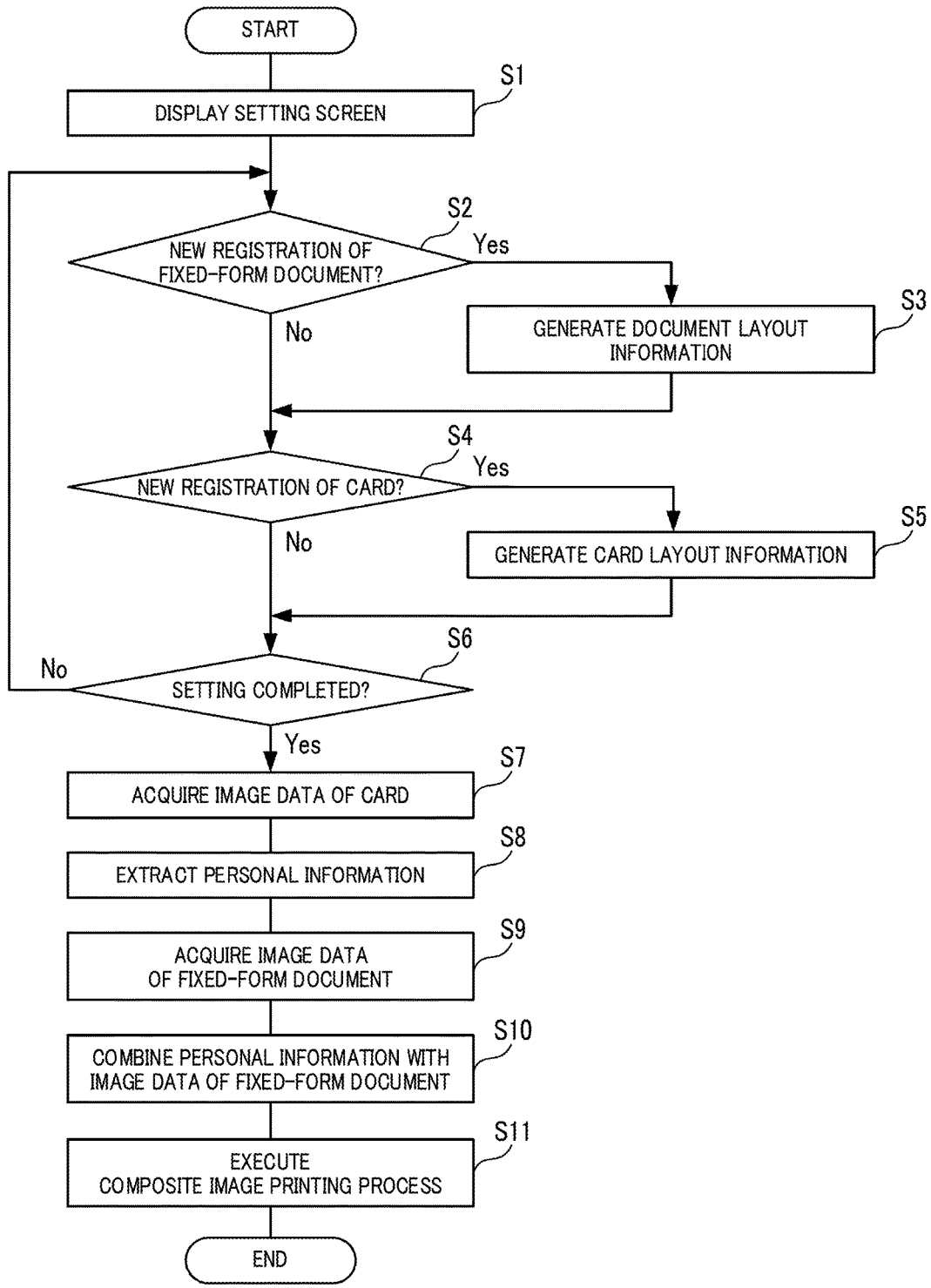
FIG. 9 is a flowchart showing an example of a procedure of a filled document printing process executed in the image forming apparatus according to the embodiment of the present disclosure.

Next, an example of the procedure of a filled document printing process executed by the control portion 16 is described with reference to FIG. 9. Here, steps S1, S2, . . . represent numbers assigned to the processing procedures (steps) executed by the control portion 16. It is noted that the filled document printing process is, for example, started in response to a detection of a predetermined operation (for example, an operation of an operation key for starting the filled document printing process) performed on the operation portion (the operation/display portion 10).

<Step S1>

Figures 10, 11:
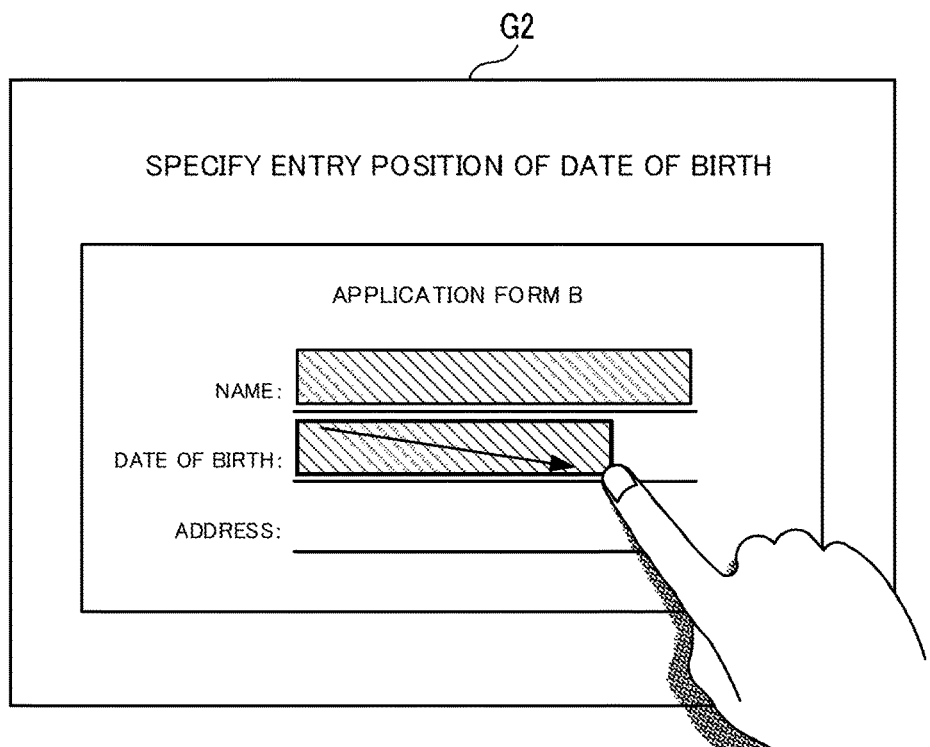
FIG. 10 is a diagram showing an example of a print setting screen displayed on the image forming apparatus according to the embodiment of the present disclosure.
FIG. 11 is a diagram showing an example of a new registration screen displayed on the image forming apparatus according to the embodiment of the present disclosure.

First, in step S1, the control portion 16 displays a setting screen G1 shown in FIG. 10 on the operation/display portion 10. The setting screen G1 includes drop-down lists B1 and B2, a text box B3, a check box B4, and operation keys K1 to K4.

The drop-down list B1 is a user interface for selecting a type of fixed-form document to be output, from among a plurality of types of fixed-form documents registered in the document layout information D2. The operation key K1 is an operation key for newly registering a type of fixed-form document. The drop-down list B2 is a user interface for selecting a type of card from which personal information is to be extracted, from among a plurality of types of cards registered in the card layout information D1. The operation key K2 is an operation key for newly registering a type of card.

The operation key K3 is operated when the personal information needs to be extracted from a plurality of types of cards. Each time the operation key K3 is operated, another drop-down list B2 appears on the screen. The drop-down list B3 is a user interface for setting the number of copies of the fixed-form document to be output.

The check box B4 is a user interface for setting, when there are a plurality of types of cards from which the personal information is to be extracted, whether to generate a filled fixed-form document based on the plurality of types of cards, or to generate a filled fixed-form document for each of the plurality of types of cards.

<Step S2>

In step S2, the control portion 16 determines whether or not to newly register a fixed-form document. Specifically, upon operation of the operation key K1 included in the setting screen G1, the control portion 16 determines to newly register a fixed-form document. When the control portion 16 determines to newly register a fixed-form document (S2: Yes), the process moves to step S3. On the other hand, when the control portion 16 determines not to newly register fixed-form document (S2: No), the process moves to step S4.

<Step S3>

In step S3, the control portion 16 generates a piece of document layout information D2 for a fixed-form document to be newly registered. Specifically, the control portion 16 causes the image reading portion 12 to read the image data P2 of the fixed-form document that is to be newly registered (in this example, the fixed-form document is an application form B). Subsequently, the control portion 16 displays a registration screen G2 shown in FIG. 11 on the operation/display portion 10. On the registration screen G2, the image data P2 of the fixed-form document read by the image reading portion 12 is displayed. Subsequently, in accordance with user operations performed on the registration screen G2, the control portion 16 sets the type (namely, the identification information) of the fixed-form document, items of personal information to be filled in the fixed-form document, and composite positions of the items of personal information. The control portion 16 stores the setting content in the storage portion 15 as a piece of document layout information D2. Thereafter, the process moves to step S4.

<Step S4>

In step S4, the control portion 16 determines whether or not to newly register a card. Specifically, when the operation key K2 included in the setting screen G1 is operated, the control portion 16 determines to newly register a card. When it is determined to newly register a card (S4: Yes), the process moves to step S5. On the other hand, when it is determined not to newly register a card (S4: No), the process moves to step S6.

<Step S5>

In step S5, the control portion 16 generates a piece of card layout information D1 for the card that is to be newly registered. Specifically, the control portion 16 causes the image reading portion 12 to read image data P1 of the card to be newly registered (in this example, the card is a membership card). Subsequently, the control portion 16 displays, on the operation/display portion 10, a registration screen (not shown) for registering the card layout information. The registration screen displays the image data P1 read from the card by the image reading portion 12. Subsequently, in accordance with user operations performed on the registration screen, the control portion 16 sets the type (namely, the identification information) of the card, one or more items of personal information to be extracted from the card, and one or more recording positions of the items of personal information. The control portion 16 stores the setting content in the storage portion 15 as a piece of card layout information D1. Thereafter, the process moves to step S6.

<Step S6>

In step S6, the control portion 16 determines whether or not the setting on the setting screen G1 is completed. Specifically, upon operation of the operation key K4, the control portion 16 determines that the setting on the setting screen G1 is completed. When it is determined that the setting on the setting screen G1 is completed (S6: Yes), the process moves to step S7. On the other hand, when it is determined that the setting on the setting screen G1 is not completed (S6: No), the process returns to step S2.

<Step S7>

In step S7, the control portion 16 (the card data acquiring portion 161) acquires image data P1 of a card from which personal information is to be extracted. Specifically, the control portion 16 causes the image reading portion 12 to read, as the image data P1, an image of the card from which the personal information is to be extracted, and acquires the image data P1 of the card from the image reading portion 12.

<Step S8>

In step S8, the control portion 16 (the extraction processing portion 163) extracts personal information from the image data P1 of the card acquired in the step S7. Specifically, the control portion 16 (the card layout acquiring portion 162) acquires, from the storage portion 15, a piece of card layout information D1 that corresponds to the type of the card selected from the drop-down list B2 included in the setting screen G1. Subsequently, the control portion 16 (the extraction processing portion 163) extracts one or more items of personal information from the image data P1 of the card, based on the recording positions indicated in the acquired piece of card layout information D1.

It is noted that in the step S8, the control portion 16 (the extraction processing portion 163) may extract only one or more items of personal information that should be filled in the type of fixed-form document selected from the drop-down list B1 displayed on the setting screen G1, among a plurality of items of personal information that can be extracted from the image data P1 of the card. This makes it possible to omit a wasteful process of extracting unnecessary items of personal information, resulting in a reduction of time required for extracting the personal information.

<Step S9>

In step S9, the control portion 16 (the document data acquiring portion 164) acquires image data P2 of the fixed-form document that is to be output. Specifically, the control portion 16 acquires the image data P2 from the storage portion 15 in accordance with the type of fixed-form document selected from the drop-down list B1 displayed on the setting screen G1. It is noted that in a case where the image data P2 of the fixed-form document is not stored in the storage portion 15, the control portion 16 may acquire the image data P2 of the fixed-form document from an external information processing apparatus via the communication interface 14.

<Step S10>

In step S10, the control portion 16 (the composition processing portion 166) combines the personal information extracted from the image data P1 of the card in the step S8 with the image data P2 of the fixed-form document acquired in the step S9. Specifically, the control portion 16 (the document layout acquiring portion 165) acquires, from the storage portion 15, a piece of document layout information D2 that corresponds to the type of fixed-form document selected from the drop-down list B1 displayed on the setting screen G1. Subsequently, the control portion 16 (the composition processing portion 166) combines the personal information with the image data P2 of the fixed-form document based on composite positions indicated in the acquired piece of document layout information D2.

It is noted that in the step S10, the control portion 16 may, as necessary, combine personal information that is input via the operation portion (the operation/display portion 10), as well as the personal information extracted in the step S8, with the image data P2 of the fixed-form document. In a case where at least one of the plurality of items of personal information that are to be combined with the image data P2 of the fixed-form document, has failed to be extracted in the step S8, the control portion 16 (the input receiving portion 168) displays the input screen G3 shown in FIG. 12 or FIG. 13 on the operation/display portion 10. The input screen G3 shown in FIG. 12 includes a text box B5 for receiving input of text data. The input screen G3 shown in FIG. 13 includes a handwriting input box B6 for receiving input of handwritten characters. Subsequently, the control portion 16 (the composition processing portion 166) combines the text data input via the text box B5, as well as image data representing hand-written characters input via the input box B6, with the image data P2 of the fixed-form document.

<Step S11>

In step S11, the control portion 16 (the print control portion 167) causes the image forming portion 13 to execute the composite image printing process based on the composite image data P3 generated in the step S10. Thereafter, the fixed-form document with the personal information filled therein is output from the image forming apparatus 1.

As described above, in the image forming apparatus 1 according to the present embodiment, personal information is extracted from image data P1 read by the image reading portion 12, and the extracted personal information is combined with image data P2 of a fixed-form document. Subsequently, a composite image represented by composite image data P3 is formed on a sheet. In this way, the image forming apparatus 1 according to the present embodiment can easily generate a fixed-form document with personal information filled therein, without using an electronic storage medium storing the personal information.

Modifications

In the present embodiment, the drop-down list B2 displayed on the setting screen G1 is used to select a card from which personal information is to be extracted. However, the present disclosure is not limited to this configuration. As another embodiment, for example, the control portion 16 may automatically determine the type of the card by analyzing the characteristics of the image data P1 of the card read by the image reading portion 12, wherein the characteristics include the layout and character sequences included.

In addition, in the present embodiment, the card layout information D1 or the document layout information D2 is generated via the registration screen G2 shown in FIG. 11, for example. However, the present disclosure is not limited to this configuration. As another embodiment, for example, the control portion 16 may automatically generate the card layout information D1 by analyzing the characteristics of the image data P1 of the card read by the image reading portion 12, wherein the characteristics include the layout and character sequences included. Similarly, the control portion 16 may automatically generate the document layout information D2 by analyzing the characteristics of the image data P2 of the fixed-form document read by the image reading portion 12, wherein the characteristics include the layout of the image data and character sequences included.

In addition, as a further embodiment, when the extraction processing portion 163 performes a character recognition of a card (card A), the extraction processing portion 163 may refer to a result of the character recognition of another card (card B). For example, in a case where a part of personal information read from the card A is uncertain, the personal information may be complemented based on the result of the character recognition of the card B. It is noted that in this case, the card B may be read at the same time as the card A by the image reading portion 12, or may be read before the card A is read by the image reading portion 12. For example, in a case where only the second character of a character sequence representing a company name read from the card A is uncertain, the control portion 16 may extract a character sequence whose characters match those of that character sequence of the card A except for the second character, from the result of character recognition of the card B. Subsequently, the control portion 16 uses the extracted character sequence as the character sequence representing the company name read from the card A.

Figure 12:
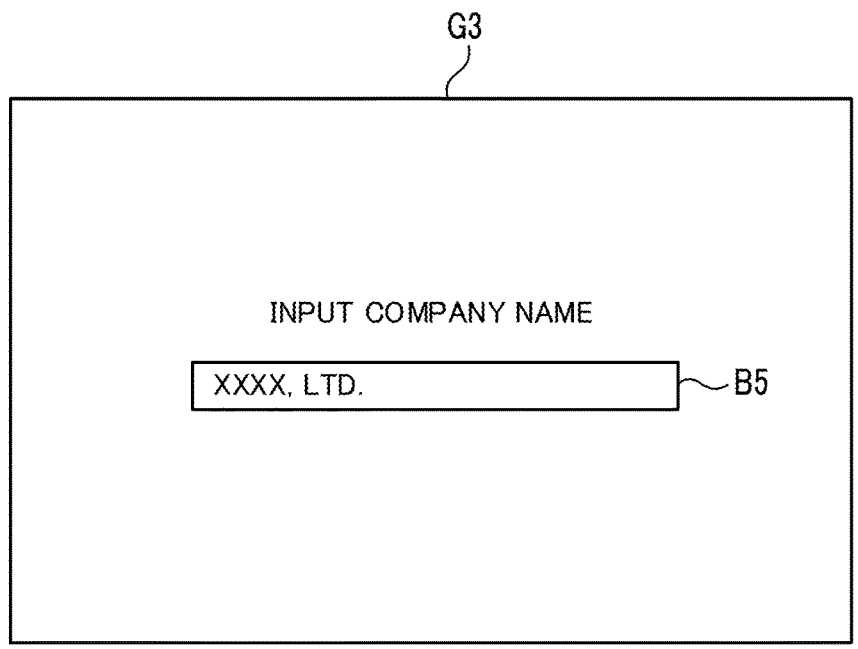
FIG. 12 is a diagram showing an example of a personal information input screen displayed on the image forming apparatus according to the embodiment of the present disclosure.
Figure 13:
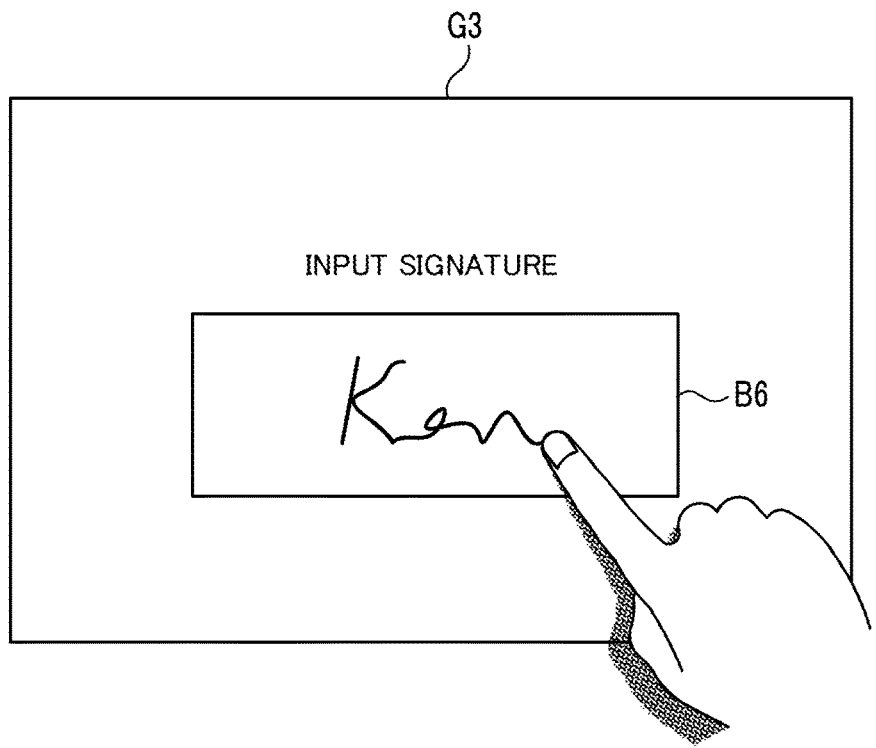
FIG. 13 is a diagram showing another example of the personal information input screen displayed on the image forming apparatus according to the embodiment of the present disclosure.

As a still further embodiment, the control portion 16 may store, in the storage portion 15, image data representing text data or hand-written data input via the input screen G3 shown in FIG. 12 or FIG. 13, in association with an item of personal information and the user's name (user identification information). Then, later, the control portion 16 may automatically combine the text data or the image data stored in the storage portion 15 with the image data P2 of the fixed-form document.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a document sheet table on which a document sheet is placed;
an image scanner configured to read image data of the document sheet placed on the document sheet table;
an image forming portion configured to form an image on a sheet;
a card data acquiring portion configured to acquire a plurality of pieces of image data of a plurality of cards that are placed together with each other on the document sheet table from one piece of image data read by the image scanner;
an extraction processing portion configured to extract one or more items of personal information from the plurality of pieces of image data of the plurality of cards acquired by the card data acquiring portion;
a document data acquiring portion configured to acquire image data of a fixed-form document;
a document layout acquiring portion configured to acquire document layout information that indicates one or more composite positions in the image data of the fixed-form document where the one or more items of personal information are to be combined;
a composition processing portion configured to generate composite image data by combining the personal information extracted by the extraction processing portion with the image data of the fixed-form document in accordance with the document layout information; and
a print control portion configured to cause the image forming portion to execute a composite image printing process of printing a composite image on the sheet, the composite image being represented by the composite image data generated by the composition processing portion.

2. The image forming apparatus according to claim 1, further comprising:
a card layout acquiring portion configured to acquire card layout information which indicates one or more items of personal information and recording positions of the one or more items of personal information, the personal information being recorded on a surface of the card, wherein
the extraction processing portion extracts the one or more items of personal information from the image data of the card based on the card layout information.

3. The image forming apparatus according to claim 2, further comprising:
an operation portion configured to receive an information input operation from a user, wherein
the card layout acquiring portion acquires the card layout information via the operation portion.

4. The image forming apparatus according to claim 2, wherein
the card layout acquiring portion acquires the card layout information based on image data of the plurality of cards of a same type read by the image scanner.

5. The image forming apparatus according to claim 1, wherein
the extraction processing portion extracts a plurality of items of personal information from the image data of the card, and
the document layout information indicates a composite position for each of the plurality of items of personal information.

6. The image forming apparatus according to claim 1, further comprising:
an operation portion configured to receive an information input operation from a user, wherein
the document layout acquiring portion acquires the document layout information via the operation portion.

7. The image forming apparatus according to claim 1, wherein
the extraction processing portion extracts, as the one or more items of personal information, one or more pieces of text data respectively corresponding to the one or more items of personal information by executing a character recognition process on the image data of the card, and the composition processing portion combines the text data extracted by the extraction processing portion with the image data of the fixed-form document.

8. The image forming apparatus according to claim 1, further comprising:

an operation portion configured to receive an information input operation from a user; and an input receiving portion configured to, in a case where at least one of the one or more items of personal information that are to be combined with the image data of the fixed-form document has failed to be extracted by the extraction processing portion, acquire the at least one item of personal information via the operation portion, wherein the composition processing portion combines the one or more items of personal information extracted by the extraction processing portion, as well as the at least one item of personal information acquired by the input receiving portion, with the image data of the fixed-form document.

9. The image forming apparatus according to claim 1, wherein the composition processing portion combines a plurality of items of personal information extracted from the plurality of pieces of image data of the plurality of cards placed together with each other on the document sheet table, with image data of one fixed-form document.

10. The image forming apparatus according to claim 1, wherein the composition processing portion executes a process of combining personal information extracted from the plurality of pieces of image data of the plurality of cards, with the image data of the fixed-form document, individually for each of the plurality of cards placed together with each other on the document sheet table, and the print control portion causes the image forming portion to execute the composite image printing process for each of the plurality of cards placed together with each other on the document sheet table.

11. An image forming apparatus comprising:

a document sheet table on which a document sheet is placed;

an image scanner configured to read image data of the document sheet placed on the document sheet table;

an image forming portion configured to form an image on a sheet;

a card data acquiring portion configured to acquire, from one piece of image data read by the image scanner, image data of a card when the card and a fixed-form document are placed together with each other on the document sheet table;

an extraction processing portion configured to extract one or more items of personal information from the image data of the card;

a document data acquiring portion configured to acquire, from the one piece of image data read by the image scanner, image data of the fixed-form document placed together with the card on the document sheet table;

a document layout acquiring portion configured to acquire document layout information that indicates one or more composite positions in the image data of the fixed-form document where the one or more items of personal information are to be combined;

a composition processing portion configured to generate composite image data by combining the personal information extracted by the extraction processing portion with the image data of the fixed-form document in accordance with the document layout information; and a print control portion configured to cause the image forming portion to execute a composite image printing process of printing a composite image on the sheet, the composite image being represented by the composite image data generated by the composition processing portion.

12. An image forming apparatus comprising:

a document sheet table on which a document sheet is placed;

an image scanner configured to read image data of the document sheet placed on the document sheet table;

an image forming portion configured to form an image on a sheet;

a card data acquiring portion configured to acquire, from the image scanner, image data of a first card placed on the document sheet table;

an extraction processing portion configured to extract one or more items of personal information from the image data of the first card acquired by the card data acquiring portion, by executing a character recognition process on the image data of the first card;

a document data acquiring portion configured to acquire image data of a fixed-form document;

a document layout acquiring portion configured to acquire document layout information that indicates one or more composite positions in the image data of the fixed-form document where the one or more items of personal information are to be combined;

a composition processing portion configured to generate composite image data by combining the personal information extracted by the extraction processing portion with the image data of the fixed-form document in accordance with the document layout information; and a print control portion configured to cause the image forming portion to execute a composite image printing process of printing a composite image on the sheet, the composite image being represented by the composite image data generated by the composition processing portion, wherein the extraction processing portion extracts the one or more items of personal information from the image data of the first card by referring to a result of a character recognition performed on a second card that is different from the first card.

13. The image forming apparatus according to claim 12, wherein in a case where a part of the one or more items of personal information extracted from the image data of the first card is uncertain, the one or more items of personal information are complemented based on the result of the character recognition performed on the second card.

* * * * *